United States Patent
Olszewski et al.

(10) Patent No.: US 10,184,502 B2
(45) Date of Patent: Jan. 22, 2019

(54) INSERT FOR CONDUCTOR CLAMP INSULATING STRUCTURE

(71) Applicant: Preformed Line Products, Mayfield Village, OH (US)

(72) Inventors: Jonathon Olszewski, Elyria, OH (US); Lan-Ping Ling, Beachwood, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 14/918,018

(22) Filed: Oct. 20, 2015

(65) Prior Publication Data
US 2017/0108144 A1   Apr. 20, 2017

(51) Int. Cl.
| | | |
|---|---|---|
| *F16L 3/12* | (2006.01) | |
| *F16B 2/00* | (2006.01) | |
| *H02G 3/32* | (2006.01) | |
| *F16B 2/12* | (2006.01) | |
| *H02G 7/05* | (2006.01) | |

(52) U.S. Cl.
CPC .............. *F16B 2/005* (2013.01); *H02G 3/32* (2013.01); *F16B 2/12* (2013.01); *H02G 7/053* (2013.01)

(58) Field of Classification Search
CPC ... F16L 3/12; F16L 3/10; F16L 3/1041; F16L 3/1016; F16L 3/1058; F16L 3/1091; F16B 2/005; H02G 7/053; H02G 7/056; H02G 7/05; H02G 7/12; Y10T 24/44444; Y10T 24/44564; Y10T 24/44769; Y10T 24/44906
See application file for complete search history.

(56) References Cited

U.S. PATENT DOCUMENTS

| | | |
|---|---|---|
| 2,975,997 A | 3/1961 | Lindsey |
| 3,633,858 A | 1/1972 | Houston et al. |
| 4,178,470 A | 12/1979 | Jean et al. |
| 4,258,228 A | 3/1981 | Jean et al. |
| 5,014,941 A * | 5/1991 | Sherman .............. G02B 6/4439 24/135 K |
| 5,064,971 A | 11/1991 | Bogdanow |
| 5,195,704 A | 3/1993 | Louie |

(Continued)

FOREIGN PATENT DOCUMENTS

| | | |
|---|---|---|
| EP | 2433579 A1 | 3/2012 |
| GB | 2188795 A | 10/1987 |

OTHER PUBLICATIONS

Int. Search Report/Written Opinion cited in PCT/US2014/042564 dated Oct. 20, 2014, 15 pgs.

(Continued)

*Primary Examiner* — Robert Sandy
*Assistant Examiner* — Rowland Do
(74) *Attorney, Agent, or Firm* — Cooper Legal Group, LLC

(57) ABSTRACT

An insert for a conductor clamp has a body portion for applying a clamping force to a conductor. The insert includes an insert body receivable by the body portion of the conductor clamp. The insert body has a first surface adapted to face a portion of the conductor. The insert body is made from a non-metallic and electrically non-conductive material. An adhesive is applied to at least a portion of the first surface of the insert body. A friction enhancing material applied to at least a portion of the adhesive.

14 Claims, 8 Drawing Sheets

(56) References Cited

U.S. PATENT DOCUMENTS

| | | | |
|---|---|---|---|
| 5,366,389 A * | 11/1994 | Kreutter | H01R 12/724 439/571 |
| 5,435,507 A | 7/1995 | Murphy | |
| 5,704,816 A | 1/1998 | Polindori | |
| 5,817,985 A | 10/1998 | Bonds | |
| 5,981,878 A | 11/1999 | Zhao et al. | |
| 6,198,042 B1 | 3/2001 | Huston | |
| 6,554,643 B1 * | 4/2003 | Whiting | H01R 12/7064 439/567 |
| 7,432,449 B2 | 10/2008 | Kim | |
| 8,313,065 B2 | 11/2012 | Birch | |
| 9,556,975 B2 * | 1/2017 | Burns | F16L 3/10 |
| 2002/0148076 A1 * | 10/2002 | Angarola | B65D 63/14 24/16 PB |
| 2002/0188294 A1 * | 12/2002 | Couture | A61B 18/1445 606/51 |
| 2012/0132762 A1 | 5/2012 | Casenhiser et al. | |
| 2013/0306355 A1 | 11/2013 | Clement et al. | |
| 2014/0346291 A1 | 11/2014 | Booth | |
| 2014/0367531 A1 | 12/2014 | Burns et al. | |
| 2017/0141552 A1 | 5/2017 | Burns et al. | |

OTHER PUBLICATIONS

Restriction/Election Office Action cited in U.S. Appl. No. 14/305,991 dated Sep. 3, 2015, 7 pgs.

Reply Restriction/Election Office Action cited in U.S. Appl. No. 14/305,991 dated Nov. 3, 2015, 7 pgs.

Non-Final Office Action cited in U.S. Appl. No. 14/305,991 dated Dec. 9, 2015, 13 pgs.

Reply Non-Final Office Action cited in U.S. Appl. No. 14/305,991 dated Mar. 8, 2016, 9 pgs.

Final Office Action cited in U.S. Appl. No. 14/305,991 dated May 23, 2016, 12 pgs.

Reply Final Office Action cited in U.S. Appl. No. 14/305,991 dated Aug. 23, 2016, 10 pgs.

Notice of Allowance cited in U.S. Appl. No. 14/305,991 dated Sep. 19, 2016, 10 pgs.

Non-Final Office Action cited in U.S. Appl. No. 15/420,021 dated Apr. 13, 2017, 17 pgs.

Int. Preliminary Report cited in PCT Application No. PCT/US2014/042564 dated Dec. 15, 2015, 3 pgs.

* cited by examiner

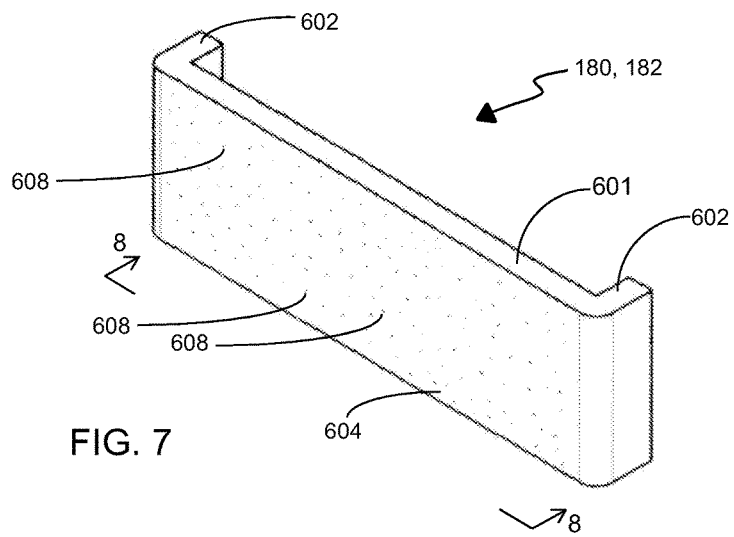
FIG. 7
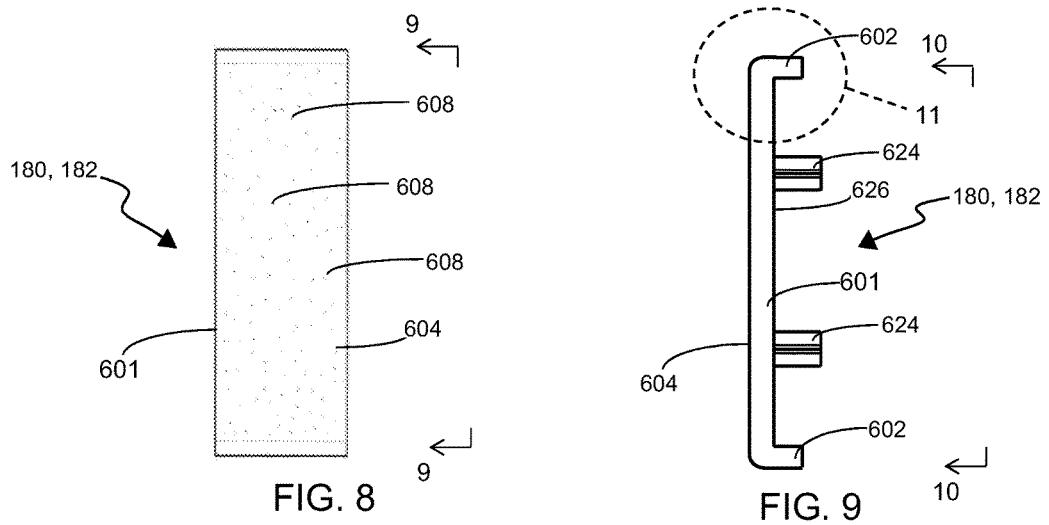
FIG. 8
FIG. 9
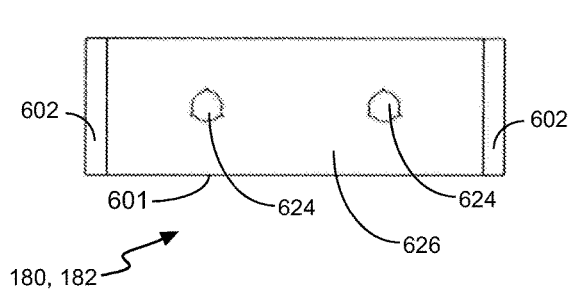
FIG. 10
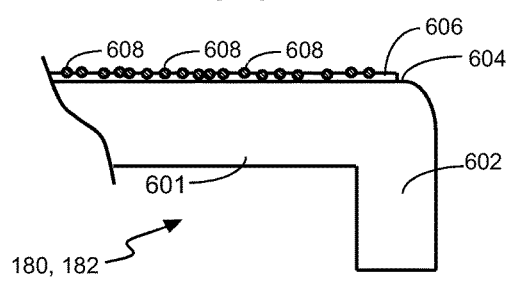
FIG. 11

INSERT FOR CONDUCTOR CLAMP INSULATING STRUCTURE

TECHNICAL FIELD

The instant application is generally directed towards an insulating structure for supporting a wire.

BACKGROUND

An insulating structure can support a wire in a conductor clamp portion. The wire can include a conductor, for example. The conductor clamp portion often includes an insert to engage a portion of the conductor and apply a holding force.

Known inserts typically match the material of the insert to the material of the conductor being supported in order to eliminate or minimize issues of galvanic corrosion damage. The matching of materials also provides a coefficient of friction to hold the conductor in place but does allow some slippage of the conductor within the conductor clamp portion.

The matching of materials necessitates an inventory of available inserts at a utility or in the field to correspond to the conductor being used. If the inventory is incomplete at the needed installation site or due to inattention, the insert material may be mismatched with the conductor material. This can result in damage to the conductor and eventual failure. Thus they need exists for an improved insert that does not suffer from the disadvantages of the known inserts.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, an insert for a conductor clamp has a body portion for applying a clamping force to a conductor. The insert comprises an insert body receivable by the body portion of the conductor clamp. The insert body has a first surface adapted to face a portion of the conductor. The insert body is made from a non-metallic and electrically non-conductive material. An adhesive is applied to at least a portion of the first surface. A friction enhancing material applied to at least a portion of the adhesive.

In another example, a conductor clamp exerts a clamping force to a conductor. The conductor clamp comprises a body portion for receiving a portion of the conductor therein. The conductor clamp comprises has a clamping portion to apply the clamping force to the conductor. A first insert body is attachable to the clamping portion of the body portion. The first insert body has a first surface adapted to face a portion of the conductor. The insert body is made from a non-metallic and electrically non-conductive material. An adhesive is applied to at least a portion of the first surface. A friction enhancing material is applied to at least a portion of the adhesive.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DESCRIPTION OF THE DRAWINGS

FIG. 7 is a perspective illustration of an insert according to one aspect;

FIG. 8 is a front elevation view of the insert, taken approximately along the line 8-8 in FIG. 7;

FIG. 9 is a top view of the insert, taken approximately along the line 9-9 in FIG. 8;

FIG. 10 is a rear elevation view of the insert, taken approximately along the line 10-10 in FIG. 9;

FIG. 11 is an enlarged view of a portion of the insert, taken approximately along the circle 11-11 in FIG. 9;

DETAILED DESCRIPTION

Figure 1:
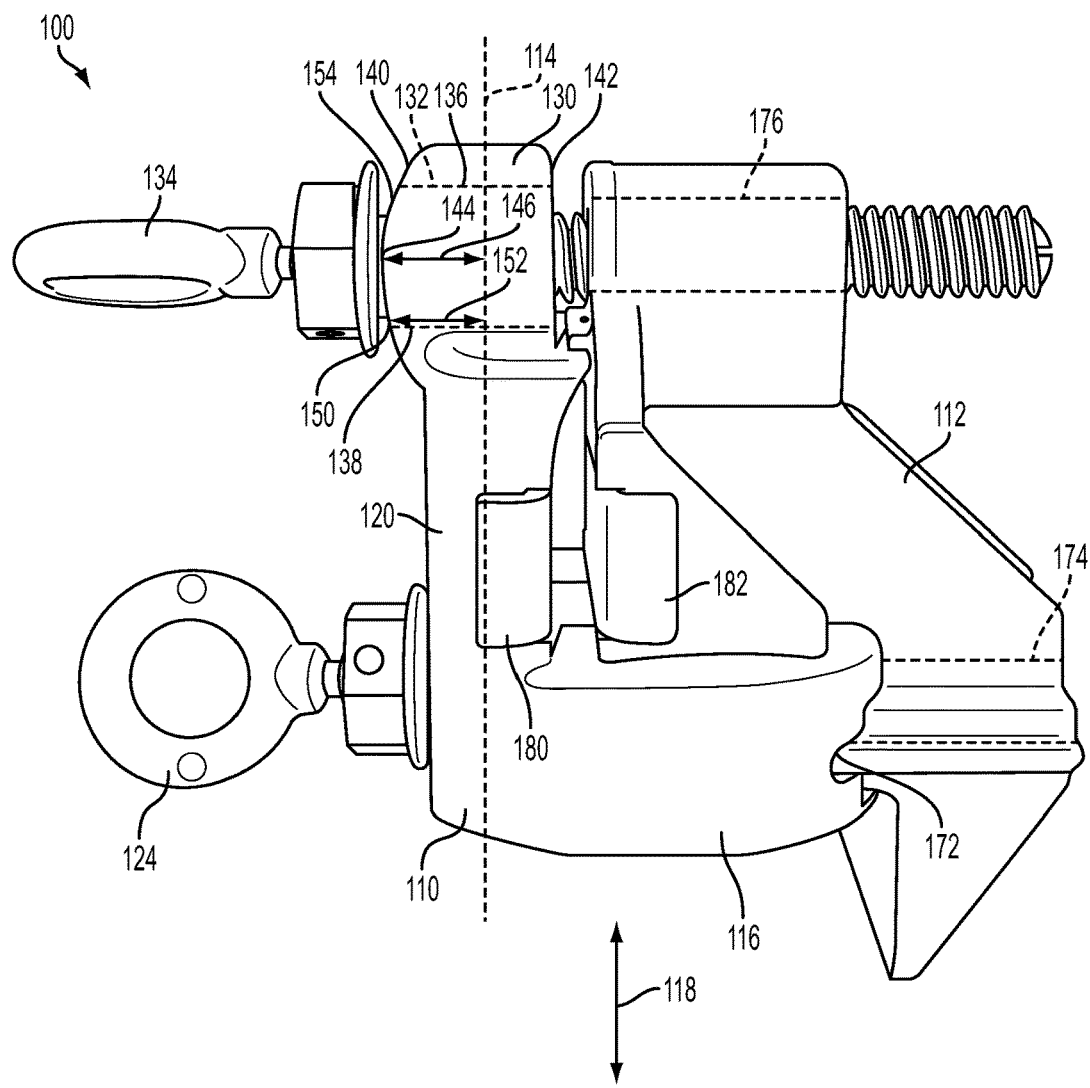
FIG. 1 illustrates an example structure.
Figure 1:
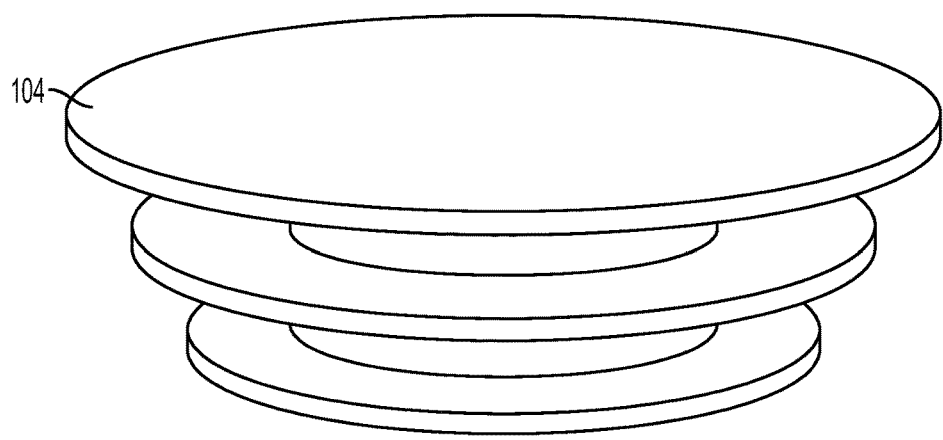

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. At least some dimensions in the drawing may not be to scale.

Turning to FIG. 1, an example structure 100, such as a conductor clamp, for supporting a conductor or wire 102 is illustrated. In some examples, the wire 102 comprises an electrical conductor. The wire 102 includes any number of sizes, shapes, constructions, etc. Indeed, in other examples, the wire 102 may be larger or smaller in cross-sectional size than as illustrated.

In general, the structure 100 can be supported by an electrical insulator 104. For example, the structure 100 can be attached to the electrical insulator 104, such that the structure 100 rests upon and is supported by the electrical insulator 104. The electrical insulator 104 can withstand operating voltage and electrical surges. The electrical insulator 104 can include any number of materials. In an example, the electrical insulator 104 includes porcelain, though other materials are envisioned, including ceramic, glass, polymers, or the like. In the illustrated example, the electrical insulator 104 may include one or more sheds that project radially outwardly from a center of the electrical insulator 104.

Figure 2:
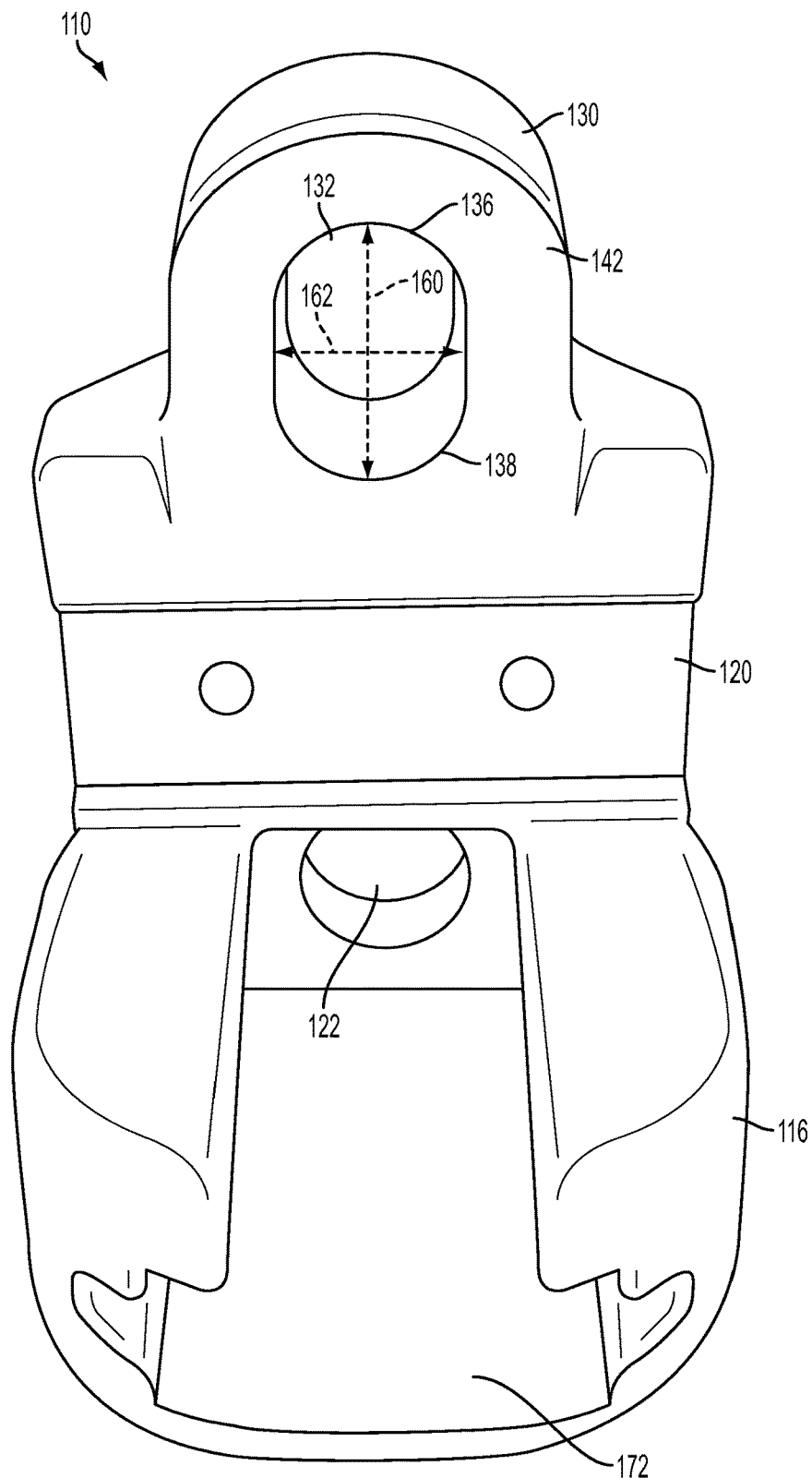
FIG. 2 illustrates an example first portion of an example structure.

Referring now to FIGS. 1 and 2 illustrating the structure 100, the structure 100 may include a first portion 110 and a second portion 112. In some examples, the first portion 110 and the second portion 112 of the structure 100 may include a non-conductive material, such as nylons, plastics, polymers, or the like.

The first portion 110 of the structure 100 can extend along a first axis 114. In an example, the first portion comprises a base portion 116. The base portion 116 may comprise a lower portion of the first portion 110. In an example, the base portion 116 can be attached 118 (illustrated generically/ schematically with arrowheads) to the electrical insulator 104. The base portion 116 can be attached 118 in any number of ways, such as with adhesives, mechanical fasteners (e.g., nuts, bolts, screws, etc.), locking/threading attachment, or the like.

The first portion 110 of the structure 100 comprises a body portion 120. In an example, the body portion 120 may extend from an end of the base portion 116 along the first axis 114. The body portion 120 comprises any number of heights/lengths (e.g., such as by extending a longer or shorter distance vertically), and is not limited to the specific dimensions illustrated herein. In an example, as illustrated in FIG. 2, the body portion 120 defines a body opening 122 into which a fastener (e.g., second fastener 124) can be received. The body opening 122 may be disposed at a lower end of the body portion 120, such that the body opening 122 is aligned with the base portion 116. The second fastener 124 comprises any number of fasteners that are sized/shaped to be received within the body opening 122. For example, the second fastener 124 can include screws, bolts, etc. and, in some examples, may be threaded.

The first portion 110 of the structure 100 comprises an alignment portion 130 coupled to the body portion 120. In an example, the alignment portion 130 is coupled to an end of the body portion 120 that is opposite the base portion 116. The alignment portion 130 defines a first alignment opening 132 through which the alignment portion 130 can receive a first fastener 134. In this example, the first alignment opening 132 is at least partially defined by an upper wall 136 and a lower wall 138. The first alignment opening 132 can extend through the alignment portion 130 between a first side 140 of the alignment portion 130 and a second side 142 of the alignment portion 130.

The alignment portion 130 comprises a first surface portion 144 that is located adjacent a midpoint of the first alignment opening 132 along the first axis 114. In an example, the first surface portion 144 is separated a first distance 146 from the first axis 114 along which the alignment portion 130 extends. The alignment portion 130 comprises a second surface portion 150 that is located adjacent the lower wall 138 of the alignment portion 130 defining the first alignment opening 132. According to some examples, the second surface portion 150 is separated a second distance 152 from the first axis 114. In some examples, the first distance 146 is different than the second distance 152. In an example, the second distance 152 is less than the first distance 146.

In the illustrated example, the first side 140 of the alignment portion 130 surrounding the first alignment opening 132 comprises an angled surface 154. In such an example, the first surface portion 144 is located a farther distance from the second side 142 than the second surface portion 150. The angled surface 154 of the first side 140 includes any number of shapes. In the illustrated example, this angled surface 154 comprises a rounded, arcuate shape that has a peak width adjacent the midpoint of the first alignment opening 132 along the first axis 114. The illustrated angled surface 154 is not intended to be limiting, however, and in other examples, may have a conic shape.

As illustrated in FIG. 2, in an example the first alignment opening 132 has an elongated, non-circular cross-sectional shape having an opening length 160 (e.g., up/down in FIGS. 1 and 2) extending along the first axis 114 and an opening width 162 (e.g., into/out of page in FIG. 1) extending substantially transverse to the first axis 114. In some examples, the opening length 160 is greater than the opening width 162. In this example, the first alignment opening 132 has an elongated oval shape in which the upper wall 136 and the lower wall 138 are rounded/curved while lateral walls are generally straight. Such as shape is not intended to be limiting, however, and in other examples, the first alignment opening 132 may include a rectangular shape. In these examples, the first alignment opening 132 has a size that is larger than a cross-sectional size of the first fastener 134 such that the first fastener 134 can move/translate within the first alignment opening 132 up and down along the first axis 114.

Referring to FIG. 1, the structure 100 may include the second portion 112. In this example, the second portion 112 can engage with the first portion 110 such that the second portion 112 is movably attachable to the first portion 110. In an example, the base portion 116 of the first portion 110 defines a channel 172 into which a lower portion of the second portion 112 can be received.

The second portion 112 can include a fastener opening 174 extending at least partially through the lower portion of the second portion 112. The fastener opening 174 is sized/ shaped to receive the second fastener 124. In an example, the fastener opening 174 may be threaded such that the second fastener 124 can threadingly engage the fastener opening 174 so as to movably attach the first portion 110 to the second portion 112. In such an example, the second fastener 124 can be tightened/loosened (e.g., by rotating clockwise or counterclockwise) such that the second portion 112 and the first portion 110 can be moved closer together or farther apart.

The second portion 112 can define a second alignment opening 176 through which the second portion 112 can receive the first fastener 134 such that the second portion 112 is attached to the first portion 110. In some examples, the second alignment opening 176 is positioned at an upper end of the second portion 112 opposite the fastener opening 174. The second alignment opening 176 is sized/shaped to receive the first fastener 134. In an example, the second alignment opening 176 may be threaded such that the first fastener 134 can threadingly engage the second alignment opening 176 so as to movably attach the first portion 110 to the second portion 112. In such an example, the first fastener 134 can be tightened/loosened (e.g., by rotating clockwise or counterclockwise) such that the second portion 112 and the first portion 110 can be moved closer together or farther apart.

The structure 100 can include a first insert or mating portion 180 and a second insert or mating portion 182. In an example, the first mating portion 180 may be attached to the first portion 110 while the second mating portion 182 may be attached to the second portion 112. The first mating portion 180 can be attached to the first portion 110 in any number of ways, such as with adhesives, fasteners (e.g., screws, bolts, etc.), locking structures, snap fit attachment (e.g., first mating portion 180 received within slot in first portion 110) or the like. Likewise, the second mating portion 182 can be attached to the second portion 112 in any number of ways, such as with adhesives, fasteners (e.g., screws, bolts, etc.), locking structures, snap fit attachment (e.g., second mating portion 182 received within slot in second portion 112) or the like.

The first mating portion 180 and the second mating portion 182 can contact/engage the conductor or wire 102 when the wire 102 is positioned within and/or supported by the structure 100. In an example, the wire 102 may be sandwiched between the first mating portion 180 and the second mating portion 182. The first mating portion and the second mating portion 182 comprise any number of materials.

The first insert or mating portion 180 is constructed substantially the same as the second insert or mating portion 182. Thus, by way of example, only the first insert or mating portion 180 will be described in detail below and illustrated in FIGS. 7-11, and will equally apply for the description of the second insert or mating portion 182.

The insert 180, 182 includes a central body portion 601. The insert 180, 182 has a pair of integrally formed retaining edges 602 extending in the same direction from opposite ends of the body portion 601. The retaining edges 602 are intended to extend around axially opposite sides of the body portion 120 to minimize or prevent relative movement, in a direction substantially parallel to the extent of the conductor or wire 102, between the wire supporting structure 100 and the insert 180, 182. The insert 180, 182 is preferably made from a non-metallic and electrically non-conductive material, such as a polymer or ceramic, in order to eliminate issues with galvanic corrosion. By way of example in one aspect, the insert 180, 182 is nylon. It will be apparent that any suitable non-metallic and electrically non-conductive material that has sufficient strength will suffice. The material that the insert 180, 182 is made from permits fewer inserts to be carried in inventory because the insert is compatible with any conductor material that is being used.

The central body portion 601 of the insert 180, 182 has a main or first surface 604 that is adapted to face in a direction toward the conductor or wire 102. The first surface 604 is provided with a friction enhancing surface that includes numerous grit particles 608 for engaging the conductor or wire 102 in order to prevent or minimize movement of the conductor or wire 102 relative to the body portion 120 in a direction parallel to the extent of the conductor or wire.

The central body portion 601 also has a pair of locating and retaining structures 624 extending from a rear or back second surface 626 in the same direction as the retaining edges 602. The locating and retaining structures 624 serve to properly locate the insert 180, 182 with in the body portion 120 and to restrain the insert from movement relative to the body portion.

As illustrated in FIG. 11, in order to apply the numerous grit particles 608 onto the first surface 604 of the body portion 601, a layer of adhesive 606 is applied to the first surface. The adhesive 606 may be of any suitable adhesive material or binder, such as Trinkote CL-250-55. The density or thickness of the adhesive 606 is dependent upon several factors, such as the size and composition of the grit particles 608 and the conductor or wire 102 to be used. By way of example, the thickness of the adhesive 606 is preferably less than the average size of the grit particles 608.

While FIG. 11 illustrates the grit particles 608 as being generally spherical or circular, it will be apparent and preferable that other suitable shapes and configurations may be employed. The grit particles 608 are preferably made from an electrically nonconductive and nonmetallic material that is resistant to environmental conditions that it may be exposed to. For example, the material that the grit particles 608 may be selected from the non-limiting group of, crushed glass, green glass, any suitable ceramic, such as aluminum oxide. The average size of the grit particles 608 is preferably in the range of an ANSI #60-#70 grit (250-212 micron). It will be apparent that any suitable size for the grit particles may be used.

The insert 180, 182 may optionally include a covering (not shown) material in order to protect the adhesive 606 and grit particles 608 from environmental elements and during handling and installation. The covering material may be of any suitable material such as, neoprene.

Test data showing the efficacy of the insert 180, 182 is provided in the table below. As a summary, one test conductor is unjacketed and has an outside diameter more than 24.13 millimeters (0.95 inch), and the conductor clamp has a 2 mm (0.079 inches) slip load of over 317.5 kilograms (700 pounds) that is a significant improvement over currently known inserts. Another test conductor is unjacketed and has an outside diameter in the range of 8.89 millimeters (0.35 inches) to 11.18 millimeters (0.44 inches), and the conductor clamp has a 2 mm (0.079 inches) slip load of over 272.15 kilograms (600 pounds). Another test conductor is jacketed and the conductor clamp has a 2 mm (0.079 inches) slip load of over 181.44 kilograms (400 pounds) when the outside diameter of the test conductor is in the range of 7.62 millimeters (0.3 inches) to 10.16 millimeters (0.4 inches). Yet another jacketed conductor clamp has a 2 mm (0.079 inches) slip load of over 567 kilograms (1250 pounds) when the outside diameter of the test conductor is more than 25.4 millimeters (1 inch).

The test procedure used was:
place insert in place between clamp jaws and against conductor (tail of conductor is loose to eliminate skewing of holding strength);
torque clamp bolts to 70 in-lbs;
clamping force is applied perpendicular to the conductor;
application of test force is applied to conductor eight feet from clamp test assembly;
starting tensile load was 100 lbf, increased load rate at 250 lbf per min; and
starting slip at 100 lbf was recorded and continuous slip up to 2 mm.

Test Results

| | | Slip Load (Lbs) | |
|---|---|---|---|
| Conductor | Insert | Avg Start | Avg 2 mm |
| ACSR (1.000 dia) | known H ceramic | 312 | 312 |
| ACSR (1.000 dia) | known P aluminum | 333 | 634 |
| ACSR (1.000 dia) | new nylon & grit | 712 | 1148 |
| Jacketed (0.450 dia) | known H ceramic | 235 | 235 |
| Jacketed (0.331 dia) | known P nylon | 310 | 374 |
| Jacketed (0.450 dia) | new nylon & grit | 328 | 441 |
| Jacketed (1.060 dia) | known H ceramic | 310 | 310 |
| Jacketed (1.060 dia) | known P nylon | 774 | 1231 |
| Jacketed (1.060 dia) | new nylon & grit | 1166 | >1300 |
| ACSR (0.390 dia) | known H ceramic | 248 | 248 |
| ACSR (0.390 dia) | known P aluminum | 347 | 570 |
| ACSR (0.390 dia) | new nylon & grit | 657 | 952 |

Figure 12:
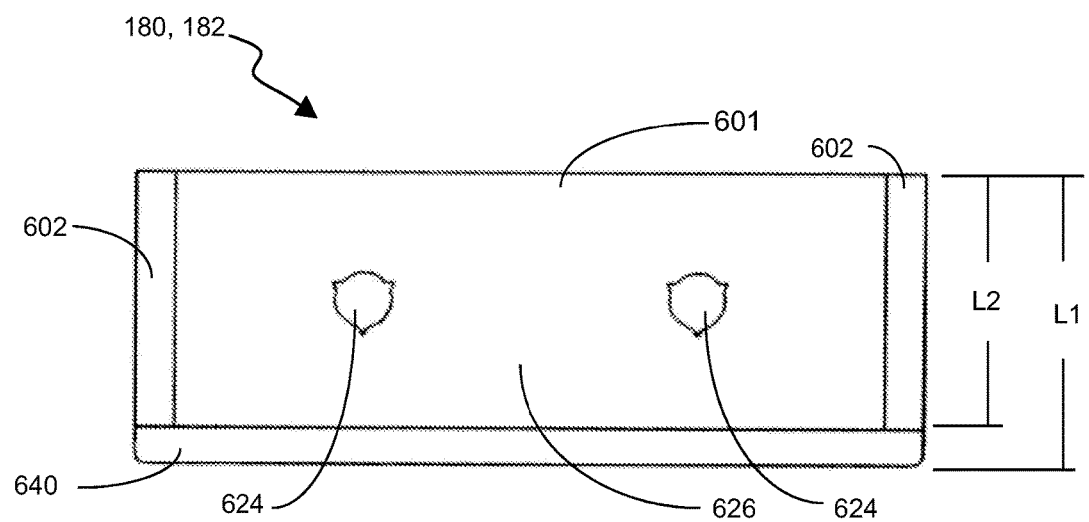
FIG. 12 is an illustration of an insert according to an aspect.
Figure 13:
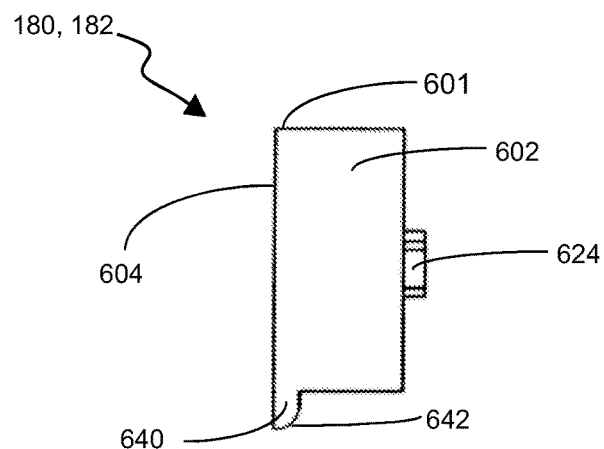
FIG. 13 is an illustration of an insert according to an aspect.

An insert 180, 182, according to an alternate aspect illustrated in FIGS. 12-13, is constructed similar to the exemplary insert illustrated in FIGS. 7-11. The insert 180, 182 illustrated in FIGS. 12-13 includes a central body portion 601 that extends for a first length L1 (FIG. 12). The insert 180, 182 is preferably made from a non-metallic and electrically non-conductive material, such as a polymer or ceramic, in order to eliminate issues with galvanic corrosion.

By way of example in one aspect, the insert 180,182 is nylon. It will be apparent that any suitable non-metallic and electrically non-conductive material that has sufficient strength will suffice. The material that the insert 180,182 is made from permits fewer inserts to be carried in inventory because the insert is compatible with any conductor material that is being used.

The central body portion 601 of the insert 180, 182 has a main or first surface 604 that is adapted to face in a direction toward the conductor or wire 102. The first surface 604 is provided with a friction enhancing surface that includes numerous grit particles (not shown) for engaging the conductor or wire 102 in order to prevent or minimize movement of the conductor or wire 102 relative to the body portion 120 in a direction parallel to the extent of the conductor or wire.

The insert 180, 182 has a pair of integrally formed retaining edges 602 extending in the same direction from opposite ends of the body portion 601 for a second length L2. The first length L1 of the body portion 601 is greater than the second length L2 of the retaining edges 602. The retaining edges 602 are intended to extend around axially opposite sides of the body portion 120 to minimize or prevent relative movement, in a direction substantially parallel to the extent of the conductor or wire 102, between the wire supporting structure 100 and the insert 180, 182.

The central body portion 601 also has a pair of locating and retaining structures 624 extending from a rear or back second surface 626 in the same direction as the retaining edges 602. The locating and retaining structures 624 serve to properly locate the insert 180, 182 with in the body portion 120 and to restrain the insert from movement relative to the body portion.

An extension portion 640 of the body portion 601 extends beyond the extent or second length L2 of the retaining edges 602. The extension portion may be provided with friction enhancing particles, such as numerous grit particles (not shown) for engaging the conductor or wire 102 in order to prevent or minimize movement of the conductor or wire 102 relative to the body portion 120 in a direction parallel to the extent of the conductor or wire. The extension portion 640 has a rearward facing edge 642 (FIG. 13) that is radiused. The extension portion 640 of the body portion 601 allows the insert to better grip the conductor or wire 102 that may have a relatively smaller diameter, such as less than about 0.67 inch.

Figure 3:
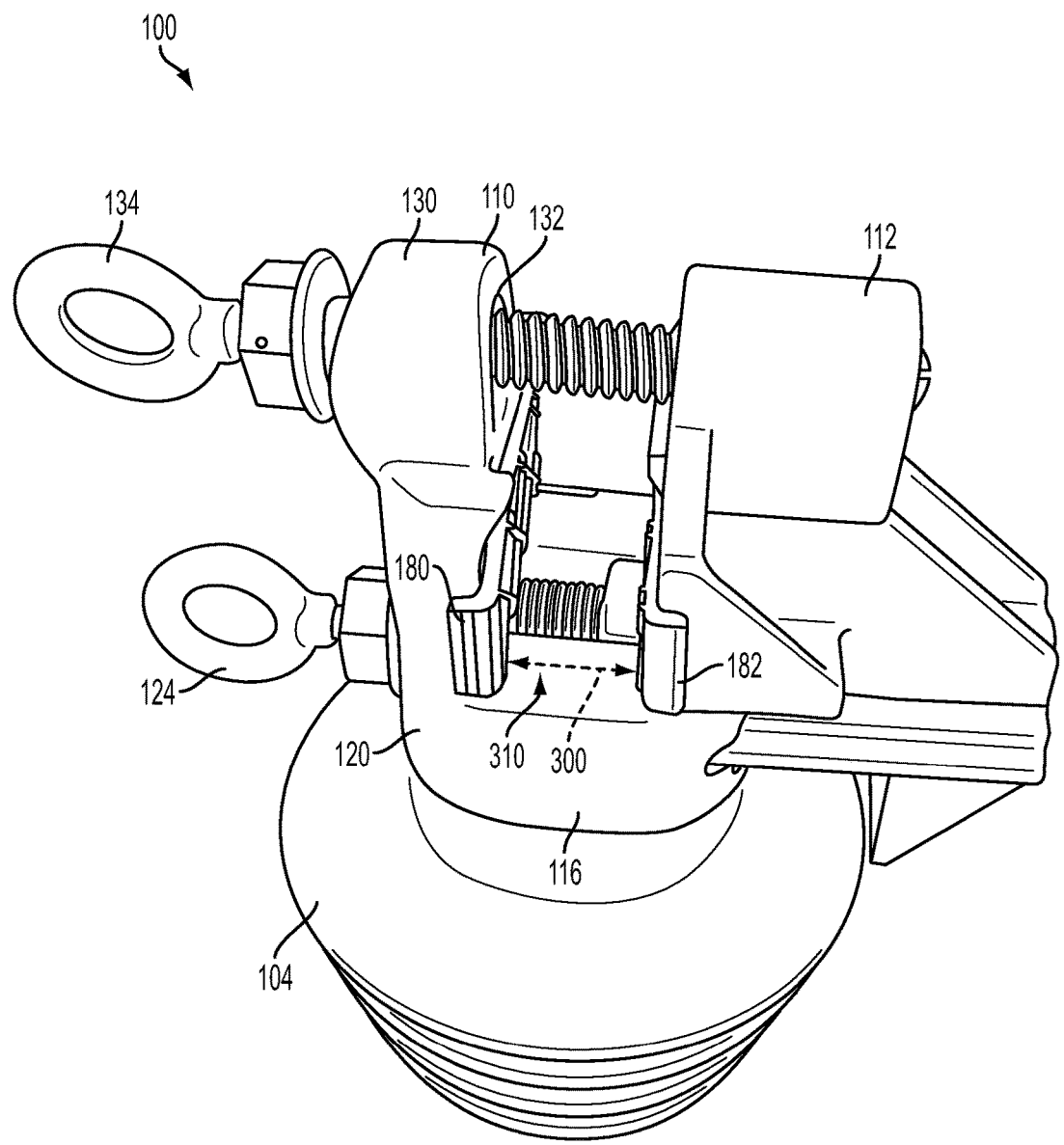
FIG. 3 illustrates an example structure.

Turning to FIG. 3, the structure 100 is illustrated with the first portion 110 separated from the second portion 112 such that the structure 100 can receive the wire 102. In an example, the first fastener 134 and the second fastener 124 can be rotated so as to move the second portion 112 into closer proximity to or farther proximity from the first portion 110. In this example, the second portion 112 may be spaced a distance 300 from the body portion 120 of the first portion 110 to define a wire opening 310 into which the wire 102 is received for support by the structure 100. It will be appreciated that the wire 102 is not illustrated in FIG. 3, but, instead, is illustrated in FIG. 4, for illustrative purposes and to more clearly show portions of the structure 100 in FIG. 3.

Figure 4:
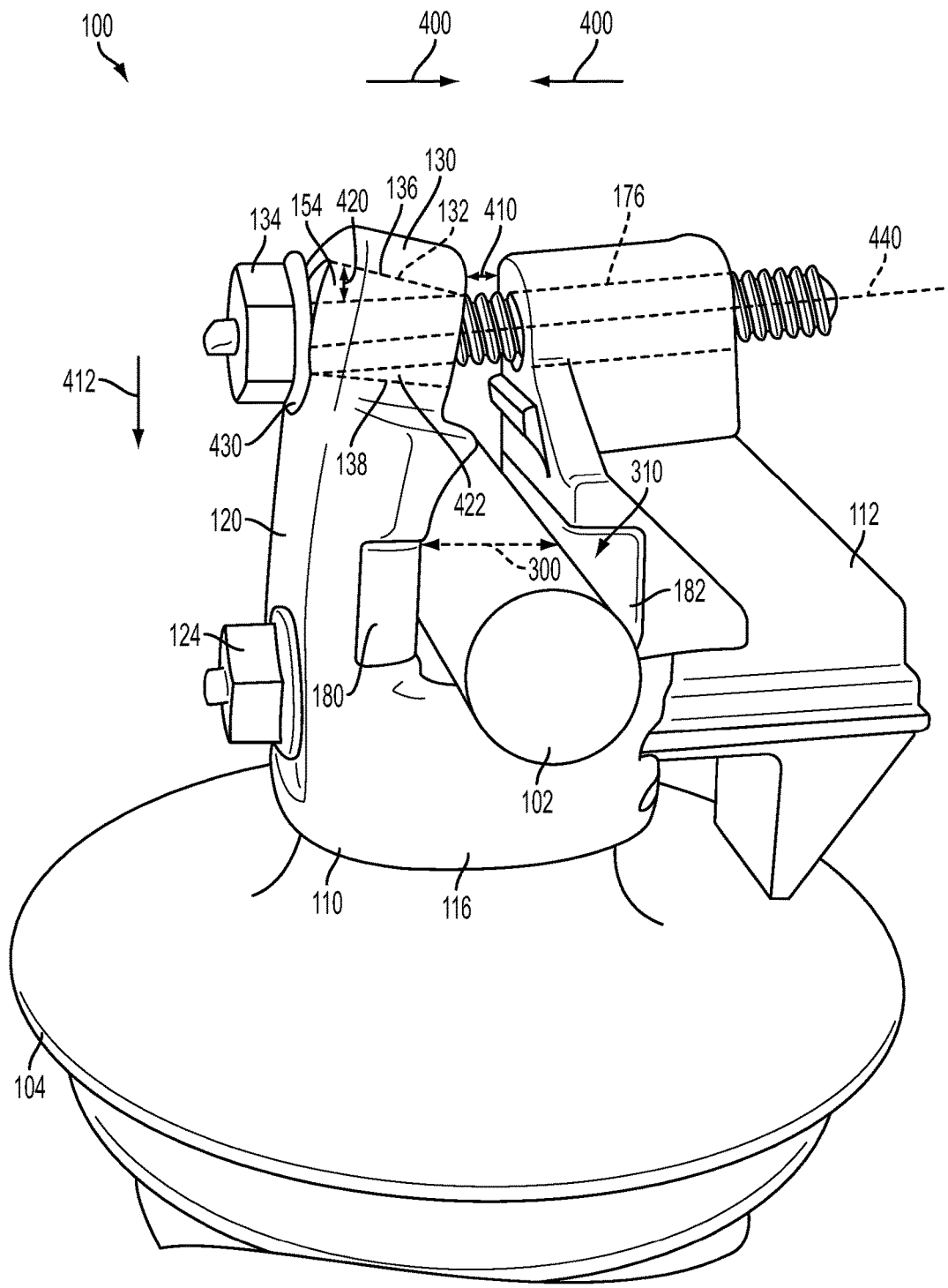
FIG. 4 illustrates an example structure.

Turning now to FIG. 4, the wire 102 can be received within the wire opening 310. It will be appreciated that in an example, the wire 102 may be received within the wire opening 310 before the first fastener 134 is inserted through the first alignment opening 132 and the second alignment opening 176. For example, the wire 102 may first be inserted/received within the wire opening 310. With the wire 102 in place, the first fastener 134 may then be inserted into the first alignment opening 132 and the second alignment opening 176. Once the wire 102 is received within the wire opening 310, the first portion 110 and the second portion 112 of the structure 100 can be moved 400 towards each other. This movement 400 is illustrated generically/schematically with arrowheads. This movement 400 can be accomplished by rotating and tightening the first fastener 134 and the second fastener 124, such that the wire 102 is sandwiched between the first portion 110 and the second portion 112.

When the wire 102 is received within the wire opening 310 and the second portion 112 is attached to the first portion 110 via the first fastener 134, the second portion 112 may be spaced a separating distance 410 from the alignment portion 130. In an example, the first fastener 134 can be tightened to a greater degree than the second fastener 124, such that the alignment portion 130 may be brought into closer proximity to the second portion 112 than the body portion 120. As such, the separating distance 410 (e.g., between the alignment portion 130 and the second portion 112) is less than the distance 300 (e.g., between the body portion 120 and the second portion 112).

Due to this separating distance 410 being less than the distance 300, the first portion 110 may exhibit at least some degree of flexion, bending, bowing, etc., as illustrated. Indeed, this flexion, bending, bowing, etc. of the first portion 110 allows for the first fastener 134 to move 412 in a downward direction towards the body portion 120. In an example, the first fastener 134 can move downwardly within the first alignment opening 132 towards the lower wall 138 and away from the upper wall 136. In this example, the first fastener 134 is separated a first alignment distance 420 from the upper wall 136 of the alignment portion 130 defining the first alignment opening 132. The first fastener 134 is separated a second alignment distance 422 from the lower wall 138 of the alignment portion 130 defining the first alignment opening 132. In the illustrated example, when the wire 102 is received within the wire opening 310 and the second portion 112 is attached to the first portion 110 via the first fastener 134, the second alignment distance 422 is less than the first alignment distance 420.

To further accommodate for the movement 412 of the first fastener 134 within the first alignment opening 132, a contact surface 430 of the first fastener 134 that is in contact with the angled surface 154 can move downwardly along the angled surface 154 towards the second surface portion 150. As such, the angled surface 154 along with the elongated first alignment opening 132 allow for the first fastener 134 to move 412 in a downward direction.

As a result of the movement 412 of the first fastener 134 downwardly within the first alignment opening 132, when the wire 102 is received within the wire opening 310 and the second portion 112 is attached to the first portion 110 via the first fastener 134, the first fastener 134 extends along a substantially linear axis 440. Indeed, the first fastener 134, when extending through the first alignment opening 132 and the second alignment opening 176, can be substantially straight while extending along the substantially linear axis 440. By extending substantially linearly, the first fastener 134 is subjected to a relatively reduced stress and bending moment as opposed to if the first fastener 134 underwent a greater degree of bending/torque. As such, the likelihood of fracture, breakage, deformation, shearing or other effects of stresses on the first fastener 134 is reduced.

Figure 5:
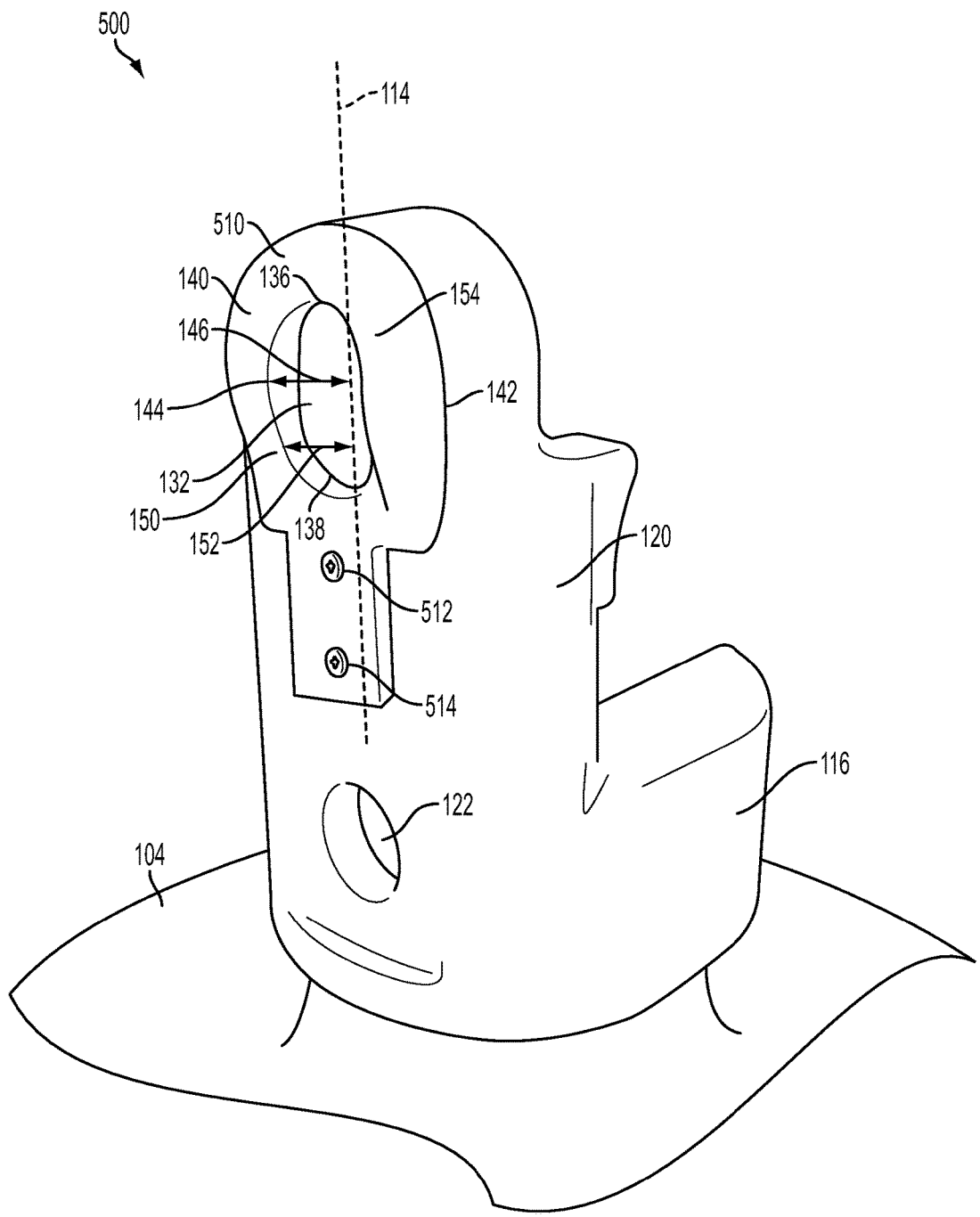
FIG. 5 illustrates an example first portion of an example structure.

Turning to FIG. 5, a second example first portion 500 is illustrated. The first portion 500 is similar in some respects to the first portion 110 of the structure 100. For example, the first portion 500 includes the base portion 116, the body portion 120, etc. Further, the first portion 500 is sized/shaped to engage/attach to the second portion 112. Together, the first portion 500 and the second portion 112 can support the wire 102 in a similar manner as described above with respect to FIG. 4.

The first portion 500 can include an alignment portion 510 that is separately coupled/attached to the body portion 120. In such an example, the alignment portion 510 can be attached in any number of ways to the body portion 120. For example, the alignment portion 510 can be attached by adhesives, fasteners, locking structures, or the like. In the illustrated example, one or more attachment structures may be provided for attaching the alignment portion 510 to the body portion 120. In this example, the alignment portion 510 is coupled to the body portion 120 by a first attachment structure 512 and a second attachment structure 514. The first attachment structure 512 and the second attachment structure 514 comprise any number of structures, such as screws, bolts, or the like.

Figure 6:
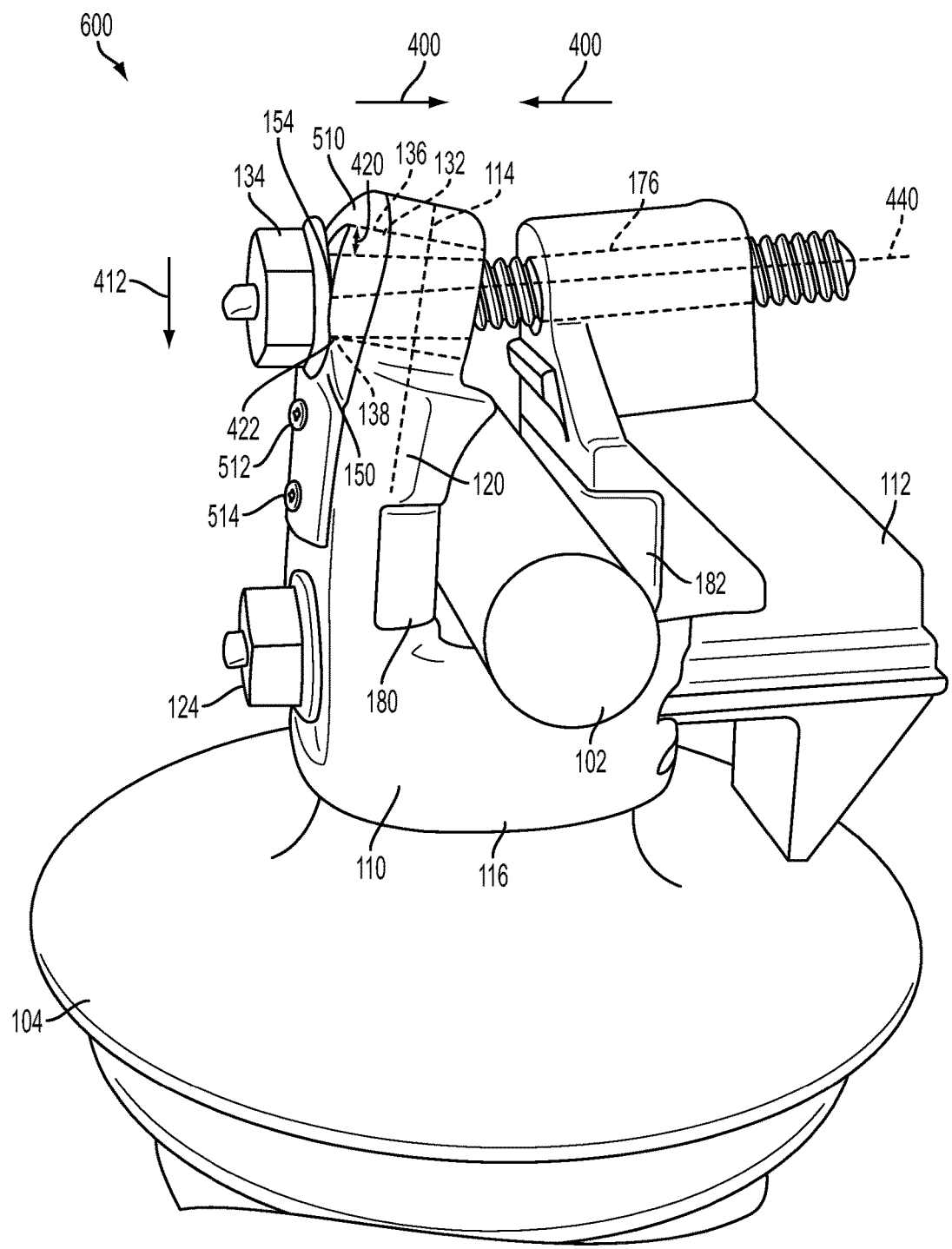
FIG. 6 illustrates an example structure.

FIG. 6 illustrates a second example structure 600. In this example, once the alignment portion 510 is attached to the body portion 120, the alignment portion 510 functions substantially identically to the alignment portion 130 described above with respect to FIGS. 1 to 4. For example, the alignment portion 510 may include the first alignment opening 132 through which the alignment portion 510 can receive the first fastener 134. The first alignment opening 132 is again defined by the upper wall 136 and the lower wall 138. The first alignment opening 132 can extend between the first side 140 of the alignment portion 510 and the second side 142 of the alignment portion 510. The alignment portion 510 may include the first surface portion 144 located adjacent the midpoint of the first alignment opening 132. The alignment portion 510 may include the second surface portion 150 located adjacent the lower wall 138 of the alignment portion 510.

In the illustrated example, the first side 140 of the alignment portion 510 has the first surface portion 144 and the second surface portion 150. In this example, the first surface portion 144 is separated the first distance 146 from the first axis 114. Similarly, the second surface portion 150 is separated the second distance 152 from the first axis 114. In this example, the first distance 146 is different than the second distance 152. For example, the second distance 152 may be less than the first distance 146.

In operation, the first fastener 134 can move 412 downwardly within the first alignment opening 132. As such, when the wire 102 is received within the wire opening 310 and the second portion 112 is attached to the first portion 110 via the first fastener 134, the first fastener 134 extends along the substantially linear axis 440. In such an example, the first fastener 134, when extending through the first alignment opening 132 of the alignment portion 510 and through the second alignment opening 176, can be substantially straight while extending along the substantially linear axis 440. By extending substantially linearly, the first fastener 134 is subjected to a relatively reduced stress and bending moment as opposed to if the first fastener 134 underwent a greater degree of bending/torque. As such, the likelihood of fracture, breakage, deformation, shearing or other effects of stresses on the first fastener 134 is reduced.

In some examples, a kit may be provided comprising the alignment portion 510. In such an example, the alignment portion 510 can be coupled to the body portion 120 of the structure 600 for supporting the wire 102. In this example, the body portion 120 extends along the first axis 114. The alignment portion 510 can define the first alignment opening 132 through which the alignment portion can receive the first fastener 134. The first alignment opening 132 extends between the first side 140 and the second side 142 of the alignment portion 510. The first side 140 of the alignment portion has the first surface portion 144 and the second surface portion 150. The first surface portion 144 is separated the first distance 146 from the first axis 114. The second surface portion 150 is separated the second distance 152 from the first axis 114. The first distance 146 may be different than the second distance 152.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first portion and a second portion generally correspond to portion A and portion B or two different or two identical portions or the same portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A conductor clamp for exerting a clamping force to a conductor, the conductor clamp comprising:
  a body portion defining a first aperture and a second aperture, the second aperture spaced a first distance from the first aperture;

an insert connectable with the body portion of the conductor clamp, the insert extending along a plane and having:
- a first surface parallel to the plane and facing a portion of the conductor,
- a second surface parallel to the plane and facing the body portion of the conductor clamp,
- a top surface, which is planar and non-parallel to the plane, extending between the first surface and the second surface, and
- a bottom surface, which is planar and non-parallel to the plane, extending between the first surface and the second surface, the top surface parallel to the bottom surface, the insert comprising:
  - a non-metallic and electrically non-conductive material;
  - a first retaining structure projecting from the second surface in a direction that is perpendicular to the plane; and
  - a second retaining structure projecting from the second surface in the direction that is perpendicular to the plane, the second retaining structure spaced a second distance from the first retaining structure, the second distance equal to the first distance, the first retaining structure received within the first aperture and the second retaining structure received within the second aperture when the insert is connected to the body portion;
an adhesive applied to at least a portion of the first surface; and
a friction enhancing material applied to at least a portion of the adhesive.

2. The conductor clamp of claim 1 wherein the insert is made from a nylon material.

3. The conductor clamp of claim 1 wherein the friction enhancing material is made from a second electrically non-conductive material.

4. The conductor clamp of claim 1 wherein the electrically non-conductive material is made from a grit particle.

5. The conductor clamp of claim 4 wherein the grit particle is made from crushed glass.

6. The conductor clamp of claim 4 wherein the grit particle is made from a ceramic particle.

7. The conductor clamp of claim 4 wherein the grit particle is made of glass.

8. The conductor clamp of claim 4 wherein the grit particle is made of aluminum oxide.

9. The conductor clamp of claim 1 further including at least one retaining edge on the insert for retaining the insert within the body portion of the conductor clamp.

10. The conductor clamp of claim 9 wherein the body portion extends for a length greater than a length that a retaining edge extends.

11. The conductor clamp of claim 1, wherein the first retaining structure has a non-circular cross-sectional shape.

12. The conductor clamp of claim 1, wherein the first retaining structure comprises one or more side features that project in a second direction non-parallel to the direction.

13. The conductor clamp of claim 1 further including a protective material covering at least a portion of the friction enhancing material and adhesive.

14. The conductor clamp of claim 1 further including a second insert attachable to a clamping portion of the body portion to be located on a side of the conductor opposite the insert, the second insert constructed substantially the same as the insert.

* * * * *